3,334,773
FLUID MOTOR WITH REMOVABLE-LOCKING END CLOSURE UNIT
Charles W. Bimba, Crete, Ill.
(101 Main St., Monee, Ill. 60449)
Filed Apr. 12, 1965, Ser. No. 447,444
4 Claims. (Cl. 220—39)

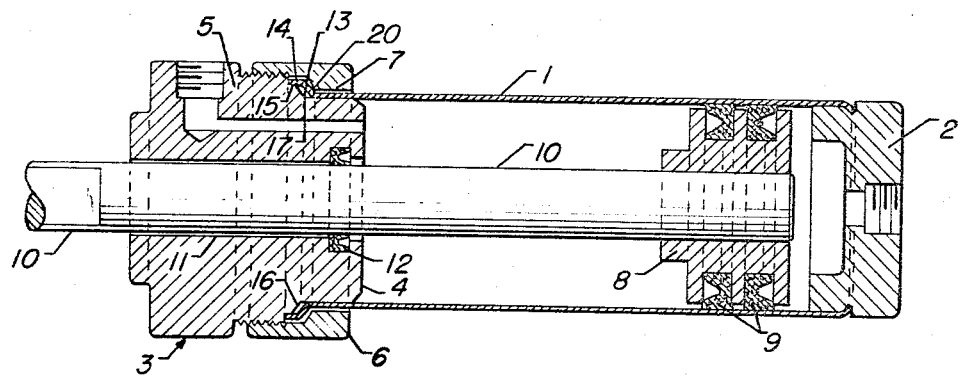
Figure 1
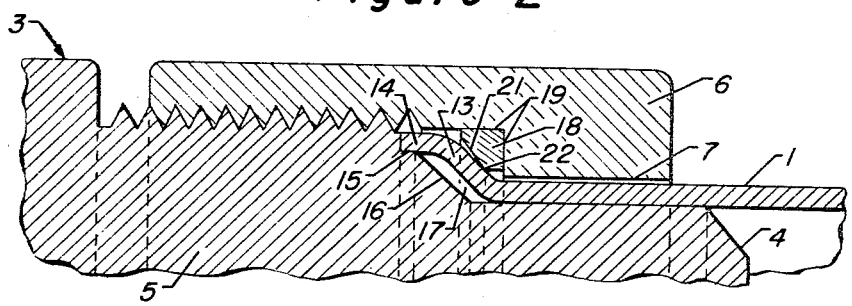
Figure 2
Figure 3
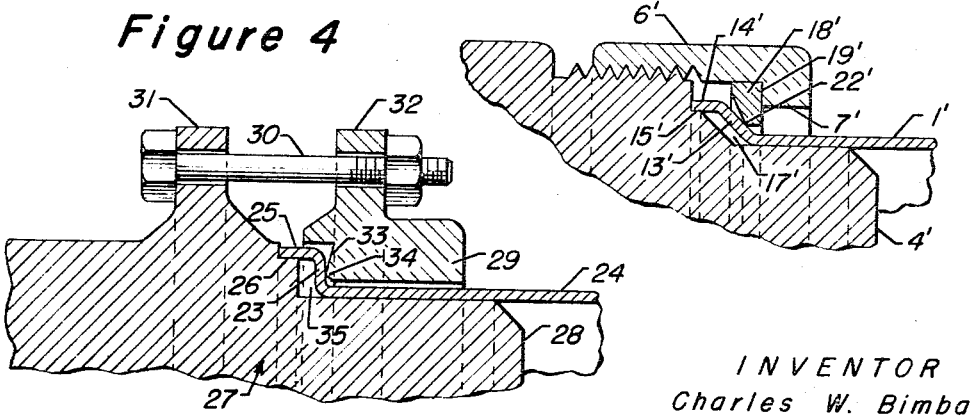
Figure 4
INVENTOR
Charles W. Bimba
BY:
*Philip J. Liggett*
ATTORNEY United States Patent Office 3,334,773
Patented Aug. 8, 1967

ABSTRACT OF THE DISCLOSURE

An improved form of casing or cylindrical body section for a fluid motor of the air-cylinder type which utilizes a locking arrangement on a flared portion of the casing embodying elastic deflection such that it will not loosen with repeated reciprocal motion and jarring from the piston in the cylinder. In the locking means, a space is provided behind the outwardly flaring portion of the flange on the casing so that a lock ring bearing against the flared portion will oppose the space and there will be a spring-like action in the coupling.

---

The present invention is directed to an improvement in the construction of a fluid motor and more specifically to means for providing a removable, locking end closure unit for the cylindrical body section of the motor.

Fluid motors may be operated with either air or liquids and are generally known as pneumatic or hydraulic cylinders. Briefly, such motors comprise a pressure retaining tubular body section or cylinder member with a smooth internal wall, end caps or closure members, a piston with grooves and seal rings, and a piston rod which must extend through at least one end cap member of the unit.

The attachment of the end caps or closure members to the cylinder body sections has, in the past, provided either a troublesome or expensive aspect in the manufacture of the smaller types of fluid motors. For example, the use of external tie rods between opposing end caps of the cylinder permits removability of caps and repair or replacement of a piston, but there is involved a bulky and expensive type of construction and assembly. The constructions which have used "rolled-in" or otherwise fixed connections between the ends of the cylinder wall and the end caps have permitted fairly rapid, low-cost manufacturing procedures; however, such constructions do not permit internal repair or replacement of the pistons, piston seals and the like. Thus, after there is excessive wear and loss of efficiency, each motor must be thrown away, rather than repaired.

Tie-rodless cylinders, as well as various other removable cap constructions have of course been tried and used, but generally most of the present known types are unsatisfactory with respect to assembly and cost aspects or do not withstand prolonged operational problems. The constant reciprocal motion of the piston in the cylinder requires that there be both shock-resistance to loosening and a strong pressure-tight seal means between the end closures and the cylinder body section. Some conventional cylinders have used special resilient types of seal rings in the cap assemblies; however, such constructions are generally expensive for the manufacturer. It is also necessary that a good construction or design automatically embody means which provides for proper axial alignment between the piston, piston rod and the inside wall of the cylinder for the obtention of a non-binding reciprocating piston movement in the unit.

It is thus a principal object of the present invention to provide an improved fluid motor construction with a locking or shock-proof type of removable end closure unit such that there may be access to the interior of the motor for repair purposes. In a related aspect, it is an object of this improved design to provide a locking construction embodying elastic deflection between an end portion of the body section and the end closure means such that separate resilient sealing rings are unnecessary to preclude loosening and/or leakage from the cylinder.

It is also an object of the present invention to provide a construction and assembly with respect to the end of the cylinder body section and the removable end closure member such that there is proper alignment of the joining members and a resulting proper axial alignment of the piston and piston rod in the cylinder.

Actually, a principal feature of the present invention is embodied in the special sizing of adjacent parts and the assembly of the closure member with respect to the end of the cylinder such that a space exists internally between a clamped, flared section of the cylinder body section and an opposing portion of closure member. Such space permits elastic deflection of the flared section of the cylinder as it is squeezed and clamped into a tight seal with seating means on the end closure member and, as a result, there is a spring-like resisting force against the deflected portion of the cylinder body section to serve as a locking means. Generally, and in accordance with a preferred construction, the cylindrical body unit of the motor will be fabricated of stainless steel or other smooth elastic materials such that it is adapted to provide resistance to deformation and also have a smooth, wear resistant, internal surface for the piston of the motor. For example, the use of stainless steel for the cylinder body section will inherently provide for the integral formation therewith of a flared end section which will operate in combination with a specially designed end closure unit so that there can be a desired self-locking clamping type of assembly.

Reference to the accompanying drawing and the following description thereof will serve to better describe the present improved motor construction and further advantages in connection therewith.

FIGURE 1 of the drawing is a diagrammatic sectional drawing of a pneumatic cylinder showing one embodiment for attaching a removable end closure to the unit.

FIGURE 2 of the drawing indicates in an enlarged partial sectional view a locking means for clamping a removable end closure member to the flared end portion of a cylindrical body section of a fluid motor unit.

FIGURE 3 of the drawing also indicates in a partial sectional view a modified construction and arrangement for effecting the attachment of a removable end closure member to a fluid motor unit.

FIGURE 4 shows in a partial sectional view still another modified construction and arrangement for effecting the bolting attachment of a removable end closure member to the flared end of a cylindrical body section of a fluid motor unit.

Referring now particularly to FIGURE 1 of the drawing, there is shown a fluid motor unit having a cylindrical body section 1 with a fixedly attached end cap or closure member 2, and an opposing removable end closure unit 3. The latter is constructed to have an interior portion 4, a larger external threaded portion 5 and a cylinder-form coupling member 6, which in turn has a ring like portion 7 having an interior diameter sized to slidably fit over the outside of the body section 1. The coupling member 6 also has internal threads sized and adapted to engage the threads of the external portion 5. The interior of the fluid motor unit is provided with a piston member 8 having grooves to accommodate seal rings 9 as well as means for connecting to a piston rod 10. The latter extends axially in a slide fit through a center hole 11 within the end closure member. A seal member 12 is also indicated within the interior portion 4 of the closure unit and around the center hole 11 so as to minimize leakage around the piston rod during the operation of the unit.

In accordance with one embodiment of the present invention, as shown in both FIGURES 1 and 2, there is provided an outwardly projecting flared portion 13 near the end of the cylindrical body section 1 as well as an enlarged diameter straight end section 14. This straight end section 14 is specifically formed or fabricated to have a trued end face that is perpendicular with respect to the elongated axis of the principal body section 1. The trued end face is in turn adapted to fit against and rest within a trued seating face or shoulder 15 formed within the interior portion 4 of the end closure unit.

As best shown in FIGURE 2 of the drawing, the interior portion 4 of the closure unit is sized to slidably fit within the inside diameter of the cylindrical body section 1 and, in addition, it has a sloping transiton wall portion 16 that is spaced away from the interior of the outwardly projecting cylinder wall section 13 when the straight end portion 14 is abutting and seating within the shoulder or seat portion 15 of the end closure member 4. Such space, indicated as 17, is necessary to permit the elastic deflection of the wall section 13 as it is clamped and squeezed internally by the tightening of the coupling member 6 on the threaded portion 5. The interior circumferential edge 20 of the ring portion 7 of the unit of FIGURE 1 is formed to effect the contact against the outside face of the sloping and outwardly projecting wall section 13. In a similar functioning manner, the specific embodiment of FIGURE 2 indicates a separate compression ring member 18 within a shoulder or seat 19 on coupling member 6 for use in effecting circumferential contact against the flared section 13 of the cylinder wall and the locking and sealing of the latter with respect to the end closure unit. The deflection or springing-in of the wall section 13 results in an opposing spring-like action which will "lock" the coupling member 6 to the threaded portion 5 of the end closure unit 3. In other words, there is an effect similar to that obtained from the action of a lock-washer which exerts force against a tightened nut. In a preferred construction, such as is utilized to obtain the desired deflection and spring action, there is indicated the use of a steel cylinder for the body section 1. For example, stainless steel which has been indicated as preferred, not only provides the desired strength for a pressure cylinder but in addition provides a rigid internally smooth wall for the reciprocating movement of the internal piston 8. It is, of course, necessary that the sizing and construction of the abutting end portion 14 of the cylindrical body section 1 within seat 15, as well as placement of transition wall section 16, provide space 17 whereby there may be the desired unopposed deflection within the projecting section 13 by the tightening of coupling member 6.

It should be further pointed out that the contact between the ring member 18, as shown in FIGURE 2, or the interior edge 20 of the coupling member 6 in FIGURE 1, which contacts the flared section 13 shall provide a thin or narrow circumferential ridge-like contact to the latter so as to more readily effect the deflection of the flared portion 13 of body section 1. As a result, the offset interior wall portion of the coupling member 6, as shown in FIGURE 1 above the edge 20, or the internal sloping face 21 of the ring member 18 in FIGURE 2 of the drawing, shall be non-parallel with respect to the exterior surface of the flared section 13 and merely permit a circumferential line or ridge contact with the latter.

In order that there be proper alignment of the piston 8 within cylinder body 1, as well as means for maintaining piston rod 10 in axial alignment with the inside wall of cylinder 1, there shall be care in effecting the machining of seat 15 of closure member 3 such that it will be at right angles with respect to the axis of the end closure unit. At the same time, care shall be taken to effect the finishing or truing of the end face of the straight short section 14 on the cylindrical body section such that the end face will be at right angles to the axis of the cylinder wall 1.

It will be evident to those familiar with pneumatic cylinders or fluid motors of the type shown in FIGURE 1 that the continuous action of the piston causes a considerable jarring effect on the entire unit and that a threaded coupling between conventionally designed internal and external clamping members would quickly loosen; however, it has been found that the present construction with the spacing 17 and the means for deflecting a flared portion of the end of the cylinder body section accomplishes a "spring-like" locking action with compression between the threads of section 5 and the coupling member 6 such that there is no subsequent loosening of the threaded engagement, even after extended periods of operation.

In FIGURE 3 of the drawing, there is indicated diagrammatically a slight modification in the construction and arrangement of the end closure unit. Specifically, there is the utilization of a coupling member 6' which has an inner diameter 7' sized to slide over the enlarged, short straight end section 14'. This enlarged coupling member precludes the necessity for its being slipped over a smaller opposing end and, in turn, permits removable end closures for both ends of a cylinder when desired. Thus, in conjunction with the enlarged diameter coupling member 6', there are utilized split ring members 18' which can be fitted into the shoulder 19' from around the exterior of cylindrical body section 1' without having to be slipped over an opposing end portion of the motor unit. Again, provision is made for effecting a line contact at edge 22' between the ring sections 18' and the exterior surface of the sloping wall section 13' to effect a compressive deflection thereof. Also, in accordance with the requirements of the present improved construction, there is provided space 17' between the inside face of the flared section 13' and the opposing transition wall section of interior section 4' so as to permit an adequate locking deflection of the wall section 13' while simultaneously effecting the abutment and sealing of the end face of the short section 14' within seat 15'.

With reference to FIGURE 4 of the drawing, there is shown still another modified embodiment of the present invention in effecting the "locked" seating and sealing of the end of a cylindrical body section with a removable end closure unit. This latter embodiment shows a substantially perpendicular flared section 23 for a cylindrical body section 24 and a short straight end section 25 which is sized to fit into a seat or shoulder 26 formed around the periphery of an end closure unit 27. As with the previously described embodiments, the latter has interior portion 28 sized to slidably fit within the interior of the cylindrical section 24. The end face of the short straight end portion 25 of body section 24, as well as the seating shoulder 26 shall, of course, be formed to be perpendicular with respect to the longitudinal axis of the motor unit to obtain the desired axial alignment of the piston rod and piston within an assembled motor unit.

Rather than utilize a threaded engagement between the internal and external portions of the end closure unit, the present embodiment provides for clamping an external coupling member 29 by means of spaced studs 30 that in turn extend between spaced opposing flanges 31 and 32 on the respective portions of the closure unit. The external coupling member 29 is provided with a shoulder section 33 which in turn has a ring-like ridge 34 to provide line contact with the outside surface of the projecting wall section 23, whereby there may be elastic deflection of such projecting section and a resulting "locked" clamping and sealing between the end of the body section and the end closure unit.

Here again, there shall, of course, be an adequate space 35 between opposing sections of the closure member 27 and the inside of wall section 23, whereby there will be no resistance to deflection in the latter as the coupling member 29 with ridge 34 is clamped against the exterior of projecting wall section 23 by the tightening of bolts 30 around the periphery of the closure unit 27. It is not intended to limit this particular modification to the exact shape or cross-sectional design for the closure sections, or to the use of any predetermined number of studs or bolts 30, in as much as three or more bolts may be utilized in a uniformly spaced manner around the periphery of the closure unit to effect the desired sealing and clamping thereof with respect to the cylindrical body section 24.

Also, while it has been indicated hereinabove that a steel or stainless steel body section is preferred for the cylinder body, it should be pointed out that other strong, smooth, elastic materials may be used in connection with certain fluid motors. For example, reinforced fiberglass or plastic tubes, etc., might be utilized, although not to the same degree of satisfaction as steel or various alloys thereof. On the other hand, a material like aluminum tubing which has low elasticity and is easily deformed will not provide the proper construction for effecting the locking seal to the removable closure unit.

It may also be noted, that where it is considered desirable for the operation of high pressure air cylinders, there may be an O-ring or other resilient type of seal ring mounted between the periphery of the interior portion 4 and an inner face of the cylindrical body section 1. However, there should be care in positioning such a seal ring to preclude any interference with the desired deflection of the flaring portion of the body section as the end closure unit is tightened to the latter.

I claim as my invention:

1. A pressure retaining cylinder with a removable and locking end closure unit, which comprises in combination, a cylinder body section having a flared and enlarged diameter end portion, the latter having an outwardly projecting wall section with an enlarged diameter and trued end face that is perpendicular with respect to the axis of said body section, a removable end closure member having an exterior portion and an interior portion with the latter sized to slip fit into the cylinder body section at said flared end portion said end closure member further having a circumferential trued seating face that is sized to abutt said trued end face of the enlarged diameter wall section, and a transition section between said exterior and interior portions thereof, the seating face of said end closure positioned with respect to said transition section so as to provide a space at least a short distance from the inner face of said outwardly projecting wall section, an exterior coupling member for said end closure unit sized to slidably fit over said cylinder body section and in addition having internally positioned circumferential ridge means, with said ridge means sized to provide a narrow circumferential line contact with the exterior surface of said projecting wall section at a point which opposes the space between the latter and said transition section to provide a spring-like action in the coupling, and adjustable connecting means between said coupling member and said exterior portion of said end closure.

2. A pressure retaining fluid motor with a removable, and locking end closure unit, which comprises in combination, a cylindrical body section having a flared and enlarged diameter end portion, the latter having an outwardly projecting wall section and a short straight end section which is in a plane parallel to and concentric with the longitudinal axis of said body section, with said straight end section being provided with a trued end face that is perpendicular with respect to the axis of said body section, a removable end closure member having an exterior portion and an interior portion with the latter sized to slip fit into said body section at said flared end portion said end closure member further having a circumferential trued seating face that is sized to abutt said trued end face of said enlarged diameter straight end section, and a transition section between said exterior and interior portions thereof, the seating face of said end closure positioned with respect to said transition section so as to provide a space at least a short distance from the inner face of said outwardly projecting wall section, an exterior coupling member for said end closure unit sized to slidably fit over said cylindrical body section and in addition having internally positioned circumferential ridge means sized to provide a narrow circumferential line contact with the exterior surface of said outwardlly projecting wall section, and adjustable connecting means between said coupling member and said exterior portion of said end closure member whereby, as the latter are coupled, said ridge means of the coupling member presses and springs inwardly the projecting wall section of the body section to provide a spring-like action in the locking seal between the trued face of said enlarged diameter end portion of the body section and the seat of the end closure member.

3. The fluid motor and locking end closure unit of claim 2 further characterized in that said interior portion of said end closure member has external threading sized and adapted to engage internal threading on said exterior coupling member, whereby there is a threaded connection and tightening therebetween.

4. The fluid motor and locking end closure unit of claim 2 further characterized in that said external coupling member has an internal seat adapted to hold at least one separate ring member providing said circumferential ridge means whereby to effect contact with the exterior surface of the projecting wall section of the body section.

References Cited
UNITED STATES PATENTS

| | | | |
|---|---|---|---|
| 2,522,195 | 9/1950 | Richardson | 285—334.5 |
| 2,937,891 | 5/1960 | Gressel. | |
| 3,008,735 | 11/1961 | Wijngaarden | 285—177 X |
| 3,011,844 | 12/1961 | Maha et al. | 220—3 |
| 3,065,000 | 11/1962 | Stanton | 285—177 |
| 3,225,929 | 12/1965 | Sicard | 220—39 X |

THERON E. CONDON, *Primary Examiner.*

G. E. LOWRANCE, *Assistant Examiner.*